US010676367B2

(12) United States Patent
Corma Canós et al.

(10) Patent No.: US 10,676,367 B2
(45) Date of Patent: Jun. 9, 2020

(54) DIRECT SYNTHESIS OF CU-CHA BY MEANS OF COMBINING A CU COMPLEX AND TETRAETHYLAMMONIUM AND APPLICATIONS IN CATALYSIS

(71) Applicants: Consejo Superior de Investigaciones Científicas (CSIC), Madrid (ES); Universitat Politècnica de València, Valencia (ES)

(72) Inventors: Avelino Corma Canós, Valencia (ES); Manuel Moliner Marín, Valencia (ES); Nuria Martin Garcia, Valencia (ES)

(73) Assignees: Consejo Superior de Investigaciones Cientificas, Madrid (ES); Universitat Politècnica de València, Valencia (ES)

( * ) Notice: Subject to any disclaimer, the term of this patent is extended or adjusted under 35 U.S.C. 154(b) by 197 days.

(21) Appl. No.: 15/569,700

(22) PCT Filed: May 3, 2016

(86) PCT No.: PCT/ES2016/070337
§ 371 (c)(1),
(2) Date: Oct. 26, 2017

(87) PCT Pub. No.: WO2016/177924
PCT Pub. Date: Nov. 10, 2016

(65) Prior Publication Data
US 2018/0127282 A1  May 10, 2018

(30) Foreign Application Priority Data

May 5, 2015 (ES) .................................. 201530606

(51) Int. Cl.
| | | |
|---|---|---|
| *C01B 39/48* | (2006.01) | |
| *B01J 29/76* | (2006.01) | |
| *C01B 39/02* | (2006.01) | |
| *B01J 35/00* | (2006.01) | |
| *B01D 53/94* | (2006.01) | |

(52) U.S. Cl.
CPC ............ *C01B 39/48* (2013.01); *B01J 29/763* (2013.01); *B01J 35/002* (2013.01); *C01B 39/026* (2013.01); *B01D 53/9418* (2013.01); *B01D 2255/50* (2013.01)

(58) Field of Classification Search
CPC ....... C01B 39/48; B01J 29/763; B01J 29/723; B01D 53/9418; B01D 2255/50
See application file for complete search history.

(56) References Cited

U.S. PATENT DOCUMENTS

| | | | |
|---|---|---|---|
| 4,503,024 A | 3/1985 | Bourgogne et al. | |
| 4,544,538 A | 10/1985 | Zones | |
| 7,744,850 B2 * | 6/2010 | Miller ...................... | B01J 29/70 |
| | | | 423/705 |
| 7,883,678 B2 * | 2/2011 | Li ...................... | B01D 53/9418 |
| | | | 423/212 |
| 8,007,764 B2 | 8/2011 | Miller et al. | |
| 8,715,618 B2 | 5/2014 | Trukhan et al. | |
| 8,795,626 B2 | 8/2014 | Tokunaga et al. | |
| 9,878,313 B2 * | 1/2018 | Marin ................ | B01D 53/9418 |
| 10,322,938 B2 * | 6/2019 | Jang ........................ | C01B 33/03 |
| 2008/0226545 A1 | 9/2008 | Bull et al. | |
| 2011/0076229 A1 | 3/2011 | Trukhan et al. | |
| 2015/0064088 A1 | 3/2015 | Green et al. | |

FOREIGN PATENT DOCUMENTS

| | | |
|---|---|---|
| RU | 2445166 A | 5/2011 |
| WO | 2008118434 A1 | 10/2008 |
| WO | WO 2013/159825 A1 | 10/2013 |
| WO | WO 2014/090698 A1 | 6/2014 |

OTHER PUBLICATIONS

Electronic Supplementary Information, Designed Copper-amine Complex . . . Ren et al 2011 (Year: 2011).*
Lezcano-Gonzolez et al, Chemical deactivation of Cu-SSZ-13 ammonia selective catlytic reduction (systems, Applied Catalysis B Environmental, 154-155, (2014) 339-349 (Year: 2014).*
Martin et al, High Yeild synthesis of high silica chabazite by combining the role of zeolite precursors and tetraethylammonium: SCR of NOx, ChemComm 2015, 51, 9965 (Year: 2015).*
Zheng et al, Preparation of steam-stable high silica CHA (SSZ-13) membranes for Co2/CH4 and C2H4/C2H6 seperation, Journal of Membrane Science, 475, 2015, 303-310 (Year: 2015).*
L. Ren, et al., "Designed Copper-Amine Complex as an Efficient Template for One-Pot Synthesis of Cu-SSZ-13 Zeolite With Excellent Activity for Selective Catalytic Reduction for Selective Catalytic Reduction of $No_x$ by NH3", Chemical Communications, vol. 47, No. 35, May 31, 2011, p. 9789.
L. Ren, et al., "Electronic Supplementary Information Designed Copper-Amine Complex as an Efficient Template for One-Pot Synthesis of Cu-SSZ-13 Zeolite with Excellent Activitiy for Selective Catalytic Reduction of $NO_x$ by NH 3" May 31, 2011.

(Continued)

*Primary Examiner* — David M Brunsman
(74) *Attorney, Agent, or Firm* — Suzannah K. Sundby, Esq.; Canady + Lortz LLP

(57) ABSTRACT

The present invention relates to a process for the direct synthesis of a material with a CHA zeolite structure in the silicoaluminate form thereof containing copper atoms, which comprises at least the following steps:

(i) Preparation of a mixture which contains at least one water source, one copper source, one polyamine, one source of Y tetravalent element, one source of X trivalent element, the tetraethylammonium cation as the only OSDA and one source of alkaline or alkaline earth (A) cations, and wherein the synthesis mixture has the following molar composition:

$YO_2:aX_2O_3:bOSDA:cA:dH_2O:eCu:fpolyamine$ (ii) Crystallization of the mixture obtained in (i) in a reactor;
(iii) Recovery of the crystalline material obtained in (ii).

25 Claims, 1 Drawing Sheet

(56) References Cited

OTHER PUBLICATIONS

R. Martínez Franco, et al. "Efficient One-Pot Preparation of Cu-SSZ-13 Materials Using Cooperative OSDAs for Their Catalytic Application in the SCR of NO x", Chemcatchem, vol. 5, No. 11, May 21, 2013, pp. 3316-3323.

U. Deka, et al. "Changing Active Sites in Cu-Cha catalysts: deNO$_x$ Selectivity as a Function of the Preparation Method", vol. 166, May 8, 2012, pp. 144-152.

M. Itakura, et al. "Synthesis of High-Silica CHA Zeolite from FAU Zeolite in the Presence of Benzyltrimethylammonium Hydroxide", Chemistry Letters, vol. 37. No. 9, Jan. 1, 2008, pp. 908-909.

European Search Report received in EP 3293149 dated Jan. 21, 2019.

Martin et al., "High yield synthesis of high-silica chabazite by combining the role of zeolite precursors and tetraethylammonium: SCR of NOx", May 11, 2015, pp. 9965-9968, vol. 51, Publisher: Chem. Commun.

Nedyalkova et al., "Interzeolite Conversion of FAU Type Zeolite into CHA and its Application in NH3-SCR", Jun. 4, 2013, pp. 550-557, vol. 56, No. 9-10, Publisher: Topics in Catalysis.

Office Action received in RU2017140080 dated Sep. 5, 2019.

\* cited by examiner

DIRECT SYNTHESIS OF CU-CHA BY MEANS OF COMBINING A CU COMPLEX AND TETRAETHYLAMMONIUM AND APPLICATIONS IN CATALYSIS

This application is a 371 filing of PCT/ES2016/070337, filed May 3, 2016

FIELD OF THE INVENTION

The present invention relates to a method for direct synthesis of the CHA zeolite in the silicoaluminate form thereof with copper atoms, using the specific combination of the tetraethylammonium cation (TEA) as an organic-structure-directing agent (OSDA) and a copper complex, with high synthesis yields. The present invention also relates to the use as a catalyst of the zeolite material synthesized according to the present synthesis method.

BACKGROUND OF THE INVENTION

Zeolites are microporous materials formed by $TO_4$ tetrahedra (T=Si, Al, B, P, Ti, Ge . . . ) interconnected by oxygen atoms, creating pores and cavities with a uniform size and shape in the molecular range (3-15 Å). These zeolite materials have important applications as catalysts, adsorbents or ion exchangers.

These materials are used as catalysts in numerous chemical processes, wherein the use of a determined zeolite with specific physico-chemical properties for a determined chemical process will directly depend on the nature of the reactants and products involved in the process (such as size, shape, hydrophobicity . . . ) and also on the reaction conditions. In addition, the nature of the reactants and products will affect the diffusion of these molecules in the pores and cavities of the zeolites, and consequently, the selection of the zeolite with a pore topology suitable for the products involved in the reaction is essential. In addition, the zeolite must be chemically and structurally stable under the required reaction conditions.

The nitrogen oxides (NOx), mainly emitted by automobiles during the consumption of fossil fuels, has become a serious environmental problem since they are one of the biggest contaminants of the air. In this context, selective catalytic reduction (SCR) of $NO_x$ with ammonia has been demonstrated as an efficient form of control of said undesired emissions.

Amongst the more than 200 zeolitic structures accepted by the International containing copper atoms in extra-network positions, have excellent catalytic activity for selective catalytic reduction (SCR) of $NO_x$, in addition to high hydrothermal stability (Bull, et al., U.S. Pat. No. 7,601,662, 2009; Moliner, et al., WO2013/159825, 2013). Amongst all the known zeolites with small pores, chabazite (code CHA assigned by the IZA) has received special attention. This material is formed by a tridirectional system of small pores (8A) interconnected by large cavities and also has double rings of 6 members (DA6).

The CHA zeolite in the silicoaluminate form thereof containing Cu atoms is an excellent catalyst for selective catalytic reduction (SCR) of $NO_x$ using ammonia as a reducing agent in the presence of oxygen. The incorporation of types of Cu is conventionally carried out by means of post-synthetic ion exchange treatments of the previously synthesized and calcined zeolite. This method require various steps, such as hydrothermal synthesis of silicoaluminate, calcination of the material to eliminate the OSDA, transformation to ammonium form, ion exchange of metal, and lastly, calcination in order to obtain the final zeolite with the desired metal. All these steps help to increase the total cost in obtaining the catalytic material.

In recent years, direct synthesis of silicoaluminate with a CHA structure containing copper atoms has been described using, as the only OSDA, an organometallic complex formed by copper and a polyamine with the aim of introducing cationic species of copper into the cavities of the CHA after calcining the sample in air (Chem. Commun, 2011, 47, 9783; Chin. J. Catal. 2012, 33, 92). However, the molar ratios of Si/Al obtained in the final solids are low (Si/Al~4-7). These low Si/Al ratios can pose problems in deactivating the catalyst by irreversible dealumination processes in the conditions required for SCR of $NO_x$ (vapor presence and high temperatures). In addition, these Si/Al ratios in final solids are smaller than those introduced into the synthesis gels, in particular the difference is greater when high Si/Al ratios are studied (for example in order to obtain a Si/Al ratio in the final solid of 7.6, a theoretic ratio in the gel of 17 is required, see example Cu-ZJM4-35 in Table 1 of the publication Chem. Commum. 2011, 47, 9783). These differences between the Si/Al ratios indicate that part of the Si species introduced into the synthesis medium remain in solution and are not capable of being incorporated into the final solids, resulting in low solid yields (less than 50% when Si/Al ratios greater than 7 are used). In addition, by means of this synthesis method, it is also not possible to control the quantity of copper incorporated into the zeolite, always obtaining values greater than 9% by weight. In general, it is widely acknowledged in the literature that the greater the content of copper in the zeolitic samples, the lower the hydrothermal stability the catalyst presents (Chem. Commun., 2012, 48, 8264). Definitively, this synthesis methodology does not allow the Si/Al ratio and the Cu content in the catalysts to be controlled, properties which are very important for the activity and stability of the same.

The preferred OSDA for the synthesis of CHA zeolite in the silicoaluminate form thereof is the cation N,N,N-trimethyl-1-adamantammonium (TMAdA) (Zones, U.S. Pat. No. 4,544,538, 1985, assigned to Chevron). Recently, the use of benzyltrimethylammonium (BzTMA) as an efficient OSDA for the synthesis of the silicoaluminate form of CHA has also been described (Miller et al., U.S. Pat. No. 8,007, 764, 2011, assigned to Chevron).

Taking into account the capacity of the TMAdA and BzTMA cations to direct the formation of CHA, the direct synthesis of the CHA structure in the silicoaluminate form thereof containing Cu atoms has recently been described, using specific mixtures of said OSDAs with a copper complex (Trukhan et al., U.S. Patent 2011/0076229, 2011; and Moliner et al., WO2014/090698, 2014). These descriptions allow the synthesis of these materials to be directed in greater Si/Al ranges, however they have certain disadvantages. The methodology described by Trukhan et al. always requires the combined use of two organic molecules, selected from TMAdA, BzTMA and tetramethylammonium, in addition to the organometallic copper complex formed by the addition of ammonia with a copper salt (Trukhan et al., U.S. Patent 2011/0076229). With the aim of avoiding the combined use of various OSDAs and in addition to avoiding the use of ammonia in the preparation of the material, which is extremely caustic and dangerous, in Moliner et al., the direct synthesis of the CHA structure in the silicoaluminate form thereof with copper atoms is described using one single organic molecule (TMAdA) together with a copper complex formed by a commercial linear polyamine (tetraethylenepentamine, TEPA) and a copper salt. However, the TMAdA cation has a high cost, making the process for obtaining the desired material notably expensive and limiting the possible commercial applications of this zeolite.

Therefore, in spite of the advances shown in the direct synthesis of the CHA material in the silicoaluminate form thereof containing copper atoms, there is still a need for the industry to reduce the preparation costs of this material by using other, more economic OSDAs for the preparation thereof.

DESCRIPTION OF THE INVENTION

The present invention relates to a novel method for direct synthesis of the CHA zeolite structure in the silicoaluminate form thereof containing Cu atoms in the interior thereof. This novel method requires the combination of a copper organometallic complex with a commercial and economic OSDA, such as tetraethylammonium (TEA) capable of directing the crystallization of the CHA zeolite structure. By following this synthesis methodology, it is possible to synthesize the CHA zeolite structure in the silicoaluminate form thereof containing copper atoms in the interior thereof directly with high synthesis yields, avoiding the steps required for achieving said material by means of the traditional post-synthesis methods of exchange with the metallic ion.

The present invention also relates to the use as catalyst of the materials with the Cu-containing silicoaluminate form of the CHA structure obtained according to the present methodology, for example, for the selective catalytic reduction (SCR) of NON.

Therefore, the present invention relates to a process for the direct synthesis of the material with a CHA zeolite structure in the silicoaluminate form thereof containing copper atoms, which comprises at least the following steps:
(i) Preparation of a mixture which contains at least one water source, one copper source, one polyamine for forming the Cu organometallic complex, one source of Y tetravalent element, one source of X trivalent element, the tetraethylammonium (TEA) cation as the only OSDA and one source of alkaline or alkaline earth (A) cations, and wherein the synthesis mixture has the following molar composition:

YO$_2$:aX$_2$O$_3$:bOSDA:cA:dH$_2$O:eCu:fpolyamine wherein
a ranges between 0.001 and 0.2; preferably between 0.005 and 0.1 and more preferably between 0.01 and 0.07.
b ranges between 0.01 and 2; preferably between 0.1 and 1 and more preferably between 0.1 and 0.6;
c ranges between 0 and 2; preferably between 0.001 and 1 and more preferably between 0.01 and 0.8;
d ranges between 1 and 200; preferably between 1 and 50 and more preferably between 2 and 20;
e ranges between 0.001 and 1; preferably between 0.001 and 0.6 and more preferably between 0.001 and 0.5;
f is between the range of 0.001 to 1; preferably between 0.001 to 0.6 and more preferably between 0.001 to 0.5.
(ii) Crystallization of the mixture obtained in (i) in a reactor.
(iii) Recovery of the crystalline material obtained in (ii).

According to the present invention, Y is a tetravalent element which can be preferably selected from Si, Sn, Ti, Ge and combinations thereof, and more preferably Y is Si.

The source of Si used can be selected from silicon oxide, silicon halide, colloidal silica, fumed silica, tetraalkyl orthosilicate, silicate, silicic acid, a previously synthesized crystalline material, a previously synthesized amorphous material and combinations thereof and, more preferably, it is a material selected from a previously synthesized crystalline material, a previously synthesized amorphous material and combinations thereof, and more preferably, a previously synthesized crystalline material.

According to the present invention, X is a trivalent element which can preferably be selected from Al, B, Fe, In, Ga and combinations thereof, and more preferably X is Al.

The Al source used can be selected from any aluminum salt, any hydrated aluminum oxide, any aluminum alkoxide, a previously synthesized crystalline material, a previously synthesized amorphous material and combinations thereof, and more preferably, it is a material selected from a previously synthesized crystalline material, a previously synthesized amorphous material and combinations thereof, and more preferably, a previously synthesized crystalline material.

According to a particular embodiment of the present invention, the crystalline material with the FAU zeolite structure can be used in (i) as the only source of Y and X, preferably silicon and aluminum, and may present a Si/Al ratio preferably greater than 7.

Therefore, according to a particular embodiment of the present invention, Y is Si and X is Al, consequently the process for the direct synthesis of the material with a CHA zeolite structure in the silicoaluminate form thereof containing copper atoms with high synthesis yields would comprise at least the following steps:
(i) Preparation of a mixture which contains at least one water source, one copper source, one polyamine for forming the Cu organometallic complex, one zeolite with a FAU crystalline structure such as zeolite Y, as the only source of silicon and aluminum, the tetraethylammonium cation as the only OSDA and one source of alkaline or alkaline earth (A) cations and wherein the synthesis mixture has the following molar composition:

SiO$_2$:aAl$_2$O$_3$:bOSDA:cA:dH$_2$O:eCu:fpolyamine wherein
a ranges between 0.001 and 0.2; preferably between 0.005 and 0.1 and, more preferably between 0.01 and 0.07;
b ranges between 0.01 to 2; preferably between 0.1 and 1, and more preferably between 0.1 and 0.6;
c ranges between 0 and 2; preferably between 0.001 and 1, and more preferably between 0.01 and 0.8;
d ranges between 1 and 200; preferably between 1 and 50, and more preferably between 2 and 20;
e ranges between 0.001 to 1; preferably between 0.001 and 0.6, and more preferably between 0.001 and 0.5;
f ranges between 0.001 and 1; preferably between 0.001 and 0.6, and more preferably between 0.001 and 0.5;
(ii) Crystallization of the mixture obtained in (i) in a reactor;
(iii) Recovery of the crystalline material obtained in (ii).

According to the present invention, any Cu source can be used in (i). Preferably, the copper source can be selected from nitrate, sulfate and oxalate salts and combinations thereof, amongst others.

According to the present invention, the mixture formed in (i) is free of any phosphorous source.

According to a preferred embodiment of the present invention, the mixture formed in (i) can be free of any fluoride source.

According to a preferred embodiment of the present invention, the alkaline or alkaline earth cations can be any source of these elements, preferably being selected from a source of Na, K, and combinations thereof.

According to the present invention, any polyamine or mixtures of different polyamines capable of forming a complex with copper atoms can be used in (i), irrespectively of the form thereof (cyclic, linear, branched . . . ) and irrespectively of the nature of the amine (primary, secondary or tertiary). Preferably said polyamine can be selected from tetraethylenepentamine, triethylenetetramine, 1,4,8,11-tetraazacyclotetradecane, 1,4,8,11-tetramethyl-1,4,8,11-tetraazacyclotetradecane, and combinations thereof, amongst others. Preferably the polyamine is tetraethylenepentamine.

According to the present invention, the crystallization process described in (ii) is preferably carried out in autoclaves, in conditions which can be static or dynamic (for example by means of agitation of the mixture) at a temperature selected between 100 and 200° C., preferably between 130 and 200° C. and more preferably between 130 and 175° C.; and a crystallization time which can be between 6 hours and 50 days, preferably between 1 and 20 days and more preferably between 2 and 15 days. It must be taken into account that the components of the synthesis mixture can originate from different sources which can change the crystallization conditions described.

According to a particular embodiment of the process of the present invention, it is possible to add CHA crystals to the synthesis mixture, which act as seeds facilitating the described synthesis, in a quantity of up to 25% by weight with respect to the total quantity of oxides. These crystals can be added before or during the crystallization process.

According to the process of the present invention, after the crystallization described in (ii), the resulting solid is separated from the mother liquor and is recovered. The recovery stage (iii) can be carried out by different known separation techniques, for example decantation, filtration, ultrafiltration, centrifugation or any other solid-liquid separation technique and combinations thereof.

The method of the present invention can also comprise the removal of the organic content confined in the interior of the material by means of an extraction process.

According to a particular embodiment, the removal of the organic compound confined in the interior of the material can be carried out by means of heat treatment at temperatures above 25° C., preferably between 100 and 1000° C. and over a period of time preferably between 2 minutes and 25 hours.

According to a particular embodiment of the present invention, in the process for obtaining the previously described material, at least one metal can also be introduced by means of post-synthesis processes such as impregnation, ion exchange or combinations thereof. These metals are preferably selected from precious metals and more preferably from Pt, Pd and combinations thereof, preferably being situated in extra-framework positions.

According to another particular embodiment of the present invention, in the process for obtaining the previously described material, any metal oxide containing at least one precious metal, preferably selected from Pt, Pd and combinations thereof can also be introduced.

According to another particular embodiment, the material produced according to the present invention can be pelletized using any known technique.

According to a preferred embodiment, the material obtained according to the present invention can be calcined. Therefore, the zeolite material with a CHA structure can have the following molar composition after being calcined:

$$YO_2:oX_2O_3:pA:rCu$$

wherein o ranges between 0.001 and 0.2; preferably between 0.005 and 0.1, and more preferably between 0.01 and 0.07;

wherein p ranges between 0 and 2; preferably between 0.001 and 1; and more preferably between 0.01 and 0.8;

wherein r ranges between 0.001 and 1; preferably between 0.001 and 0.6, and more preferably between 0.001 and 0.5.

According to a particular embodiment, Y is Si and X is Al, therefore, the zeolite material with a CHA structure could have the following molar composition after being calcined:

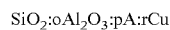

$$SiO_2:oAl_2O_3:pA:rCu$$

wherein o ranges between 0.001 and 0.2; preferably between 0.005 and 0.1, and more preferably between 0.01 and 0.07;

wherein p ranges between 0 and 2; preferably between 0.001 and 1; and more preferably between 0.01 and 0.8;

wherein r ranges between 0.001 and 1; preferably between 0.001 and 0.6, and more preferably between 0.001 and 0.5.

According to a preferred embodiment, the material obtained is Cu-SSZ-13.

According to a particular embodiment of the present invention, the zeolite material with a CHA structure obtained can also comprise a precious metal preferably selected from Pd, Pt and combinations thereof.

The present invention also relates to the use of the materials previously described and obtained according to the method of the present invention as catalysts for the conversion of supply products formed by organic compounds into products with greater added value or as a molecular sieve for the removal/separation of currents (for example gas mixtures) placing the supply products into contact with the material obtained.

According to a particular embodiment, the material obtained in the present invention can be used as a catalyst in reactions of selective catalytic reduction (SCR) of $NO_x$ (nitrogen oxides) in a gas current. SCR of $NO_x$ can in particular be carried in the presence of reducing agents, preferably selected from ammonium, urea, hydrocarbons and combinations thereof. According to this particular embodiment, the selective catalytic reduction (SCR) of $NO_x$ (nitrogen oxides) can be carried out using a monolite as the substrate and applying a layer of zeolite material obtained according to the present invention such that the gas current can pass through the same, carrying out the desired reaction. In the same way, a layer of zeolite material obtained according to the present invention can be applied to other substrates such as for example a filter through which the gaseous current passes.

According to another particular embodiment of the present invention, the material synthesized according to the present invention and which contains a precious metal such as Pt or Pd can be used as a catalyst for selective oxidation of ammonia to nitrogen. According to this particular embodiment, the selective catalytic oxidation of ammonia to nitrogen can be carried out using a monolite as the substrate and applying a layer of zeolite material obtained according to the present invention such that the gas current can pass through the same, carrying out the desired reaction. In the same way, a layer of zeolite material obtained according to the present invention can be applied to other substrates such as for example a filter, amongst others, through which the gaseous current passes.

According to another particular embodiment, the material described according to the present invention can be used in the conversion of methane to methanol (Wulfers, et al. Chem. Commun. 2015, 51, 4447).

Throughout the description and the claims, the word "comprises" and the variants thereof are not intend to exclude other technical characteristics, additions, components or steps. For the person skilled in the art, other objects, advantages and characteristics of the invention will be revealed, in part, from the description and, in part, from the practice of the invention.

EXAMPLES

Example 1

Direct Synthesis of Cu-silicoaluminate with a CHA Structure 1122.2 mg of an aqueous solution of 20% by weight of copper sulfate (II) ($CuSO_4$, Alfa Aesar, 98%) is mixed with 266.2 mg of tetraethylenepentamine (TEPA, 98%, Sigma Aldrich) in order to prepare in-situ the copper organometallic complex, and the resulting mixture is maintained under agitation for 2 hours. After this time, 9487.3 mg of an aqueous solution of tetraethylammonium hydroxide (TEAOH, Sigma Aldrich, 35% by weight in water) and 1150.1 mg of an aqueous solution of 20% by weight of sodium hydroxide are added, the resulting mixture being maintained under agitation for 15 minutes. Lastly, 3608.5 mg of a zeolite with an FAU structure (CBV-720, molar ratio $SiO_2/Al_2O_3=21$) is introduced into the synthesis mixture and is maintained under agitation for the time required to evaporate the excess water until the desired gel concentration is achieved. The final composition of the gel is $SiO_2$:0.047 $Al_2O_3$:0.022 $Cu(TEPA)^{2+}$:0.4 TEAOH:0.1 NaOH:4 $H_2O$. The resulting gel is transferred to an autoclave with Teflon liner. The crystallization is carried out at 160° C. for 7 days in static conditions. The solid product is filtered, rinsed with plenty of water, dried at 100° C. and lastly, calcined in air at 550° C. for 4 hours in order to remove the organic residues. The yield of solid obtained is greater than 90% (without taking into account the organic residues).

Figure 1:
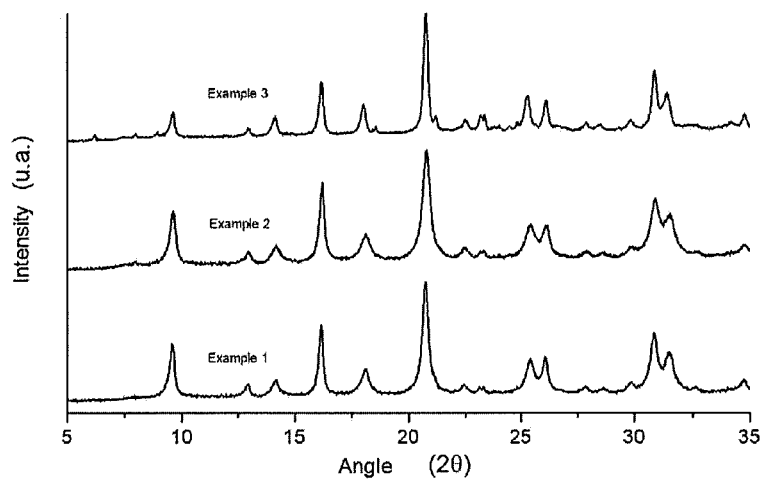
FIG. 1: PXRD patterns of the Cu-silicoaluminate materials with a CHA structure synthesized according to the present invention.

The solid is characterized by powder X-ray diffraction, obtaining the peaks characteristic of the CHA structure (see FIG. 1).

Figure 2:
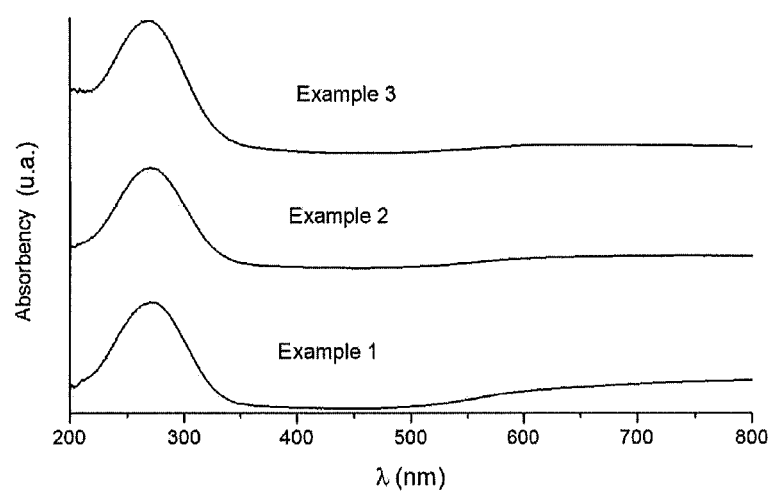
FIG. 2: UV-Vis spectra of the Cu-silicoaluminate materials with a CHA structure synthesized according to the present invention.

The crystalline material obtained without calcination is characterized by UV-Vis spectroscopy to study the stability of the molecules of the copper organometallic complex after the crystallization of the zeolite. As is observed in FIG. 2, the UV-Vis spectrum shows a single band centered at ~265 nm, which has been assigned to the presence of the Cu-TEPA complex intact in the interior of the zeolite structure (Franco, et al. 2013/159828, 2012).

Example 2

Direct Synthesis of the Cu-silicoaluminate with a CHA Structure 380.2 mg of an aqueous solution of 20% by weight of copper sulfate (II) ($CuSO_4$, Alfa Aesar, 98%) is mixed with 90.2 mg of tetraethylenepentamine (TEPA, 98%, Sigma Aldrich) in order to prepare in-situ the copper organometallic complex, and the resulting mixture is maintained under agitation for 2 hours. After this time, 1578.0 mg of an aqueous solution of tetraethylammonium hydroxide (TEAOH, Sigma Aldrich, 35% by weight in water) and 230.1 mg of an aqueous solution of 20% by weight of sodium hydroxide are added, the resulting mixture being maintained under agitation for 15 minutes. Lastly, 601.3 mg of a zeolite with an FAU structure (CBV-720, molar ratio $SiO_2/Al_2O_3=21$) is introduced into the synthesis mixture and is maintained under agitation for the time required to evaporate the excess water until the desired gel concentration is achieved. The final composition of the gel is $SiO_2$:0.047 $Al_2O_3$:0.045 $Cu(TEPA)^{2+}$:0.4 TEAOH:0.1 NaOH:4 $H_2O$. The resulting gel is transferred to an autoclave with Teflon liner. The crystallization is carried out at 160° C. for 7 days in static conditions. The solid product is filtered, rinsed with plenty of water, dried at 100° C. and lastly, calcined in air at 550° C. for 4 hours in order to remove the organic residues. The yield of solid obtained is greater than 90% (without taking into account the organic residues).

The solid is characterized by powder X-ray diffraction, obtaining the peaks characteristic of the CHA structure (see FIG. 1). The chemical analyses of the sample indicate a Si/Al ratio of 10.3 and a copper content of 4.1% by weight.

The crystalline material obtained without calcination is characterized by UV-Vis spectroscopy to study the stability of the molecules of the copper organometallic complex after the crystallization of the zeolite. As is observed in FIG. 2, the UV-Vis spectrum shows a single band centered at ~265 nm, which has been assigned to the presence of the Cu-TEPA complex intact in the interior of the zeolite structure (Franco, et al. 2013/159828, 2012).

Example 3

Direct Synthesis of the Cu-silicoaluminate with a CHA Structure 234.0 mg of an aqueous solution of 20% by weight of copper sulfate (II) ($CuSO_4$, Alfa Aesar, 98%) is mixed with 53.2 mg of tetraethylenepentamine (TEPA, 98%, Sigma Aldrich) in order to prepare in-situ the copper organometallic complex, and the resulting mixture is maintained under agitation for 2 hours. After this time, 959.1 mg of an aqueous solution of tetraethylammonium hydroxide (TEAOH, Sigma Aldrich, 35% by weight in water) and 225.1 mg of an aqueous solution of 20% by weight of sodium hydroxide and 562.9 mg of water are added, the resulting mixture being maintained under agitation for 15 minutes. Lastly, 365.3 mg of a zeolite with an FAU structure (CBV-720, molar ratio $SiO_2/Al_2O_3=21$) is introduced into the synthesis mixture and is maintained under agitation for the time required to evaporate the excess water until the desired gel concentration is achieved. The final composition of the gel is $SiO_2$:0.047 $Al_2O_3$:0.045 $Cu(TEPA)^{2+}$:0.4 TEAOH:0.2 NaOH:13 $H_2O$. The resulting gel is transferred to an autoclave with Teflon liner. The crystallization is carried out at 160° C. for 7 days in static conditions. The solid product is filtered, rinsed with plenty of water, dried at 100° C. and lastly, calcined in air at 550° C. for 4 hours in order to remove the organic residues. The yield of solid obtained is greater than 90% (without taking into account the organic residues).

The solid is characterized by powder X-ray diffraction, obtaining the peaks characteristic of the CHA structure (see FIG. 1).

The crystalline material obtained without calcination is characterized by UV-Vis spectroscopy to study the stability of the molecules of the copper organometallic complex after the crystallization of the zeolite. As is observed in FIG. 2, the UV-Vis spectrum shows a single band centered at ~265 nm, which has been assigned to the presence of the Cu-TEPA complex intact in the interior of the Zeolite Structure (Franco, et al. 2013/159828, 2012).

Example 4

Catalytic Tests for the SCR Reaction of $NO_x$

The catalytic activity for the selective catalytic reduction of $NO_x$ is studied using a quartz tubular reactor with a fixed bed of 1.2 cm diameter and 20 cm length. In a typical experiment, the catalyst is compacted into particles with a size of between 0.25-0.42 mm. They are introduced into the reactor and the temperature is increased until reaching 550° C. (see the reaction conditions in Table 1); subsequently, this temperature is maintained for one hour under a nitrogen flow. Once the desired temperature has been reached, the reactive mixture is supplied. The SCR of $NO_x$ is studied by using $NH_3$ as the reducer. The $NO_x$ present at the outlet of the gases from the reactor is analyzed continuously by means of a chemiluminescence detector (Thermo 62C). The catalytic results are summarized in Table 2.

TABLE 1

Reaction conditions of SCR of $NO_x$

| | |
|---|---|
| Total gas flow (ml/min) | 300 |
| Catalyst loading (mg) | 40 |
| NO concentration (ppm) | 500 |
| $NH_3$ concentration (ppm) | 530 |
| $O_2$ concentration (%) | 7 |
| $H_2O$ concentration (%) | 5 |
| Studied temperature range (° C.) | 170-550 |

TABLE 2

Conversion (%) of $NO_x$ at different temperatures (200, 250, 300, 350, 400, 450, 500° C.) using the Cu-CHA catalyst synthesized following the methodology described in the present invention.

Conversion (%) of $NO_x$ at different temperatures

| | 200° C. | 250° C. | 300° C. | 350° C. | 400° C. | 450° C. | 500° C. |
|---|---|---|---|---|---|---|---|
| Example 2 | 89.8 | 89.4 | 91.8 | 91.9 | 95.2 | 95.3 | 74.1 |

The invention claimed is:

1. A process for the direct synthesis of a material with a CHA zeolite structure in the silicoaluminate form thereof containing copper atoms, which comprises at least the following steps:
 (i) Preparation of a mixture which contains at least
  one water source,
  one copper source,
  one polyamine, selected from tetraethylenepentamine, triethylenetetramine, 1,4,8,11-tetraazacyclotetradecane, 1,4,8,11-tetramethyl-1,4,8,11-tetraazacyclotetradecane, and combinations thereof,
  one source of Y tetravalent element, which is Si, and one source of X trivalent element, which is Al, wherein a zeolite with an FAU structure is the only source of Y and X,
  tetraethylammonium cations as the only OSDA, and
  one source of alkaline or alkaline earth (A) cations, selected from a source of Na, K, and combinations thereof, and wherein the synthesis mixture has the following molar composition:

  $YO_2:aX_2O_3:bOSDA:cA:dH_2O:eCu:fpolyamine$ wherein
   a ranges between 0.001 and 0.2;
   b ranges between 0.01 and 2;
   c ranges between 0.01 and 0.8;
   d ranges between 1 and 200;
   e ranges between 0.001 and 1;
   f ranges between 0.001 and 1;
   and wherein the molar ratio of $A:YO_2$ is at least 0.1;
 (ii) Crystallization of the mixture obtained in (i) in a reactor; and
 (iii) Recovery of the crystalline material obtained in (ii).

2. The process for the direct synthesis of a material according to claim 1, wherein any copper source can be used in step (i).

3. The process for the direct synthesis of a material according to claim 2, wherein the copper source is selected from nitrate, sulfate and oxalate salts, or mixtures thereof.

4. The process for the direct synthesis of a material according to claim 1, wherein the polyamine of step (i) comprises primary, secondary, tertiary amines, or mixtures thereof.

5. The process for the direct synthesis of a material according to claim 4, wherein the polyamine used in step (i) is tetraethylenepentamine.

6. The process for the direct synthesis of a material according to claim 1, wherein the crystallization process described in (ii) is carried out in autoclaves, in static or dynamic conditions.

7. The process for the direct synthesis of a material according to claim 1, wherein the crystallization process described in (ii) is carried out at a temperature between 100 and 200° C.

8. The process for the direct synthesis of a material according to claim 1, wherein the crystallization time of the process described in (ii) is between 6 hours and 50 days.

9. The process for the direct synthesis of a material according to claim 1, further comprising adding CHA crystals as seeds to the synthesis mixture in a quantity up to 25% by weight with respect to the total quantity of oxides.

10. The process for the direct synthesis of a material according to claim 1, wherein the recovery step (iii) is carried out using a separation technique selected from among decantation, filtration, ultrafiltration, centrifugation, and combinations thereof.

11. The process for the direct synthesis of a material according to claim 1, further comprising extracting the organic content confined in the interior of the material.

12. The process for the direct synthesis of a material according to claim 1, further comprising removing the organic content confined in the interior of the material by means of heat treatment at temperatures of between 100 and 1000° C. for a period of time of between 2 minutes and 25 hours.

13. The process for the direct synthesis of a material according to claim 1, further comprising pelletizing the recovered crystalline material.

14. The process for the direct synthesis of a material according to claim 1, further comprising introducing at least one precious metal.

15. The process for the direct synthesis of a material according to claim 14, wherein the precious metal is selected from Pd, Pt, and combinations thereof.

16. A zeolite material with a CHA structure obtained according to the process according to claim 1, comprising the following molar composition after being calcined:

$$YO_2{:}oX_2O_3{:}pA{:}rCu$$

wherein o ranges between 0.001 and 0.2;
wherein p ranges between 0 and 2;
wherein r ranges between 0.001 and 1.

17. The zeolite material with a CHA structure obtained according to claim 16, wherein Y is Si and X is Al and the zeolite material comprises following molar composition:

$$SiO_2{:}oAl_2O_3{:}pA{:}rCu$$

wherein o ranges between 0.001 and 0.2;
wherein p ranges between 0 and 2;
wherein r ranges between 0.001 and 1.

18. The zeolite material with a CHA structure obtained according to claim 16 wherein the material is Cu-SSZ-13.

19. The zeolite material with a CHA structure obtained according to claim 16, further comprising a precious metal.

20. The zeolite material with a CHA structure obtained according to claim 19, wherein the precious metal is selected from Pd, Pt, and combinations thereof.

21. A method of removing a component from a supply current, which comprises using the zeolite material according to claim 16 as molecular sieve by contacting the zeolite material with the supply current.

22. A method of performing selective catalytic reduction (SCR) of nitrogen oxides ($NO_x$) in a gaseous current, which comprises contacting the gaseous current with the zeolite material according to claim 16.

23. The the method according to claim 22, which comprises adding a reducing agent, selected from ammonia, urea, hydrocarbons and combinations thereof to the gaseous current.

24. A method of converting methane into methanol, which comprises contacting the methane with the zeolite material according to claim 16.

25. A method for selective oxidation of ammonia to nitrogen, which comprises contacting the ammonia with the zeolite material according to claim 16.

* * * * *